United States Patent
Aoki et al.

[11] Patent Number: 6,164,918
[45] Date of Patent: Dec. 26, 2000

[54] HELICOPTER BLADE AEROFOIL

[75] Inventors: Makoto Aoki; Hiroki Nishimura; Eiichi Yamakawa, all of Kakamigahara, Japan

[73] Assignee: Advanced Technology Institute of Commuter-Helicopter, Ltd., Gifu, Japan

[21] Appl. No.: 09/176,954

[22] Filed: Oct. 22, 1998

[30] Foreign Application Priority Data

Oct. 23, 1997 [JP] Japan .................................. 9-291300

[51] Int. Cl.[7] .................................................. B63H 1/26
[52] U.S. Cl. ................................ 416/223 R; 416/DIG. 2
[58] Field of Search .............................. 416/223 R, 228, 416/243, DIG. 2

[56] References Cited

U.S. PATENT DOCUMENTS

| | | | |
|---|---|---|---|
| 3,728,045 | 4/1973 | Balch | 416/223 R |
| 4,314,795 | 2/1982 | Dadone . | |
| 4,325,675 | 4/1982 | Gallot et al. | 416/223 R |
| 4,744,728 | 5/1988 | Lednicer et al. . | |
| 5,344,102 | 9/1994 | Nakadate et al. . | |
| 5,911,559 | 6/1999 | Menthe | 416/223 R |
| 5,961,290 | 10/1999 | Aoki et al. . | |

FOREIGN PATENT DOCUMENTS

| | | | |
|---|---|---|---|
| 0262071 | 3/1988 | European Pat. Off. . | |
| 50-102099 | 8/1975 | Japan . | |
| 59-134096 | 8/1984 | Japan . | |
| 62-34600 | 7/1987 | Japan . | |
| 63-64894 | 3/1988 | Japan . | |
| 4-358995 | 12/1992 | Japan . | |
| 09240593A | 9/1997 | Japan . | |
| 11-91692 | 4/1999 | Japan . | |
| 2102505A | 6/1982 | United Kingdom | 416/223 R |

OTHER PUBLICATIONS

U.S. Patent Application Serial No. 08/945,300, filed Oct. 17, 1997.
Abstract of JP 10226397 (corresponding to Japanese Application JP 970030730 filed Feb. 14, 1997).

*Primary Examiner*—Edward K. Look
*Assistant Examiner*—Ninh Nguyen
*Attorney, Agent, or Firm*—Wenderoth, Lind & Ponack, L.L.P.

[57] ABSTRACT

Upper and lower surfaces of an aerofoil are defined by the following coordinates given in the table below, and the configuration of a leading edge of the aerofoil is defined by the following leading edge radius and the center of circle. Thus drag divergence Mach number Mdd and maximum lift coefficient Clmax can be increased and the noise level can be reduced.

| X/C | Yup/C | Ylow/C |
|---|---|---|
| 0.00000 | −0.00323 | −0.00323 |
| 0.00100 | 0.00155 | −0.00758 |
| 0.00250 | 0.00418 | −0.00925 |
| 0.00500 | 0.00782 | −0.01062 |
| 0.00750 | 0.01060 | −0.01155 |
| 0.01000 | 0.01312 | −0.01213 |
| 0.01750 | 0.01912 | −0.01316 |
| 0.02500 | 0.02381 | −0.01388 |
| 0.05000 | 0.03437 | −0.01561 |
| 0.75000 | 0.04070 | −0.01707 |
| 0.10000 | 0.04466 | −0.01852 |
| 0.15000 | 0.04893 | −0.02100 |
| 0.20000 | 0.05083 | −0.02312 |
| 0.25000 | 0.05150 | −0.02506 |
| 0.30000 | 0.05149 | −0.02663 |
| 0.35000 | 0.05105 | −0.02775 |
| 0.40000 | 0.05016 | −0.02835 |
| 0.45000 | 0.04875 | −0.02839 |
| 0.50000 | 0.04663 | −0.02767 |
| 0.55000 | 0.04359 | −0.02618 |
| 0.60000 | 0.03974 | −0.02407 |
| 0.65000 | 0.03515 | −0.02146 |
| 0.70000 | 0.03000 | −0.01847 |
| 0.75000 | 0.02451 | −0.01523 |
| 0.80000 | 0.01892 | −0.01187 |
| 0.85000 | 0.01347 | −0.00851 |
| 0.90000 | 0.00836 | −0.00529 |
| 0.95000 | 0.00381 | −0.00233 |
| 1.00000 | 0.00207 | −0.00079 |

Leading edge radius r/C=0.01073 Center of circle X/C= 0.01072, Y/C=−0.00373

4 Claims, 5 Drawing Sheets

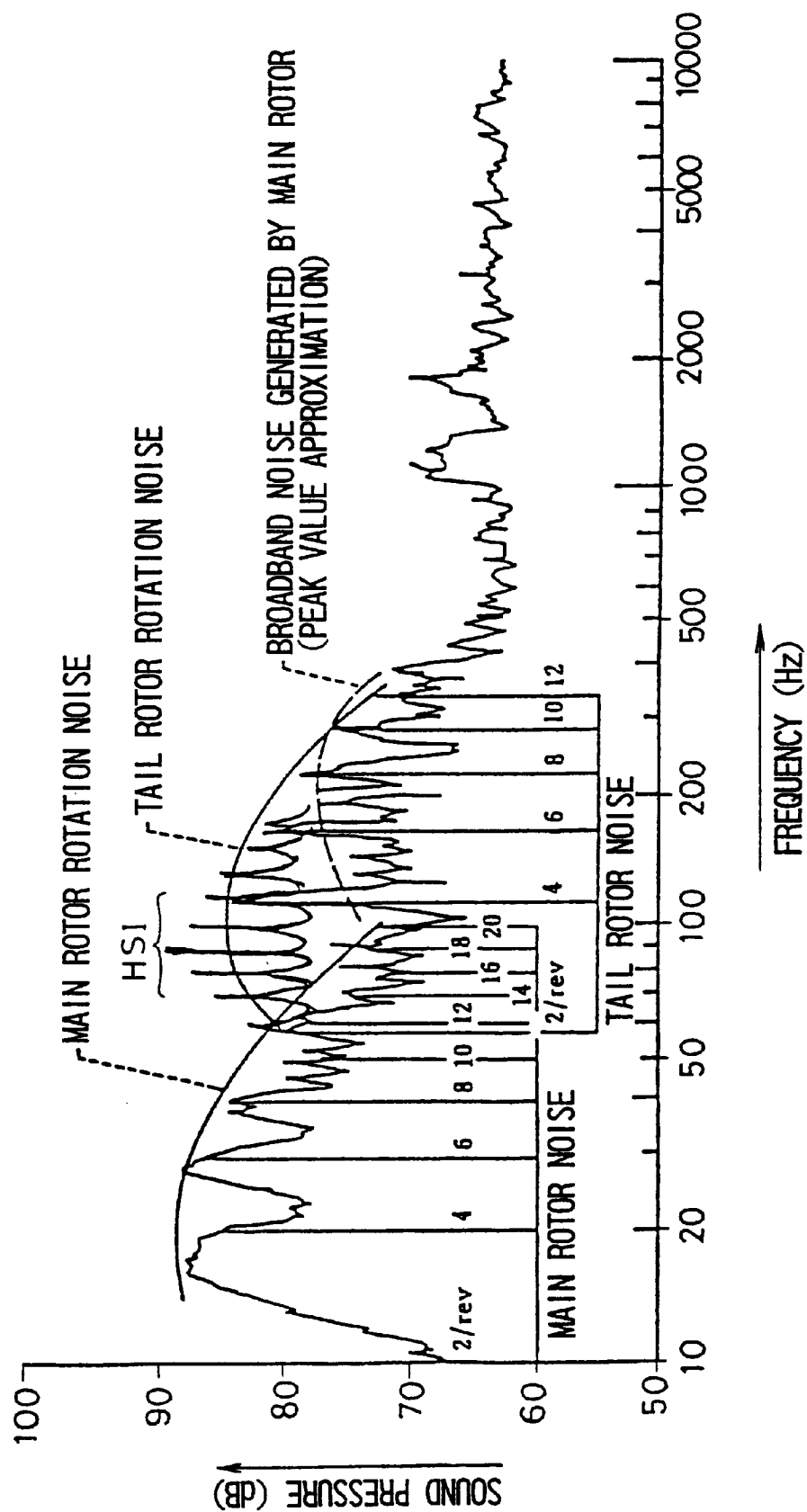

HELICOPTER BLADE AEROFOIL

BACKGROUND OF THE INVENTION

1. Field of the Invention

The present invention relates to a helicopter blade aerofoil.

2. Description of the Related Art

FIGS. 3A and 3B are illustrative views for showing aerodynamic characteristics of a rotor of a helicopter in forward flight. As shown in FIG. 3A, when a helicopter 1 with a rotor having a radius R which is rotating at a rotational angular velocity Ω advances at a ground velocity V, the airspeeds of an advancing blade where the rotational speed of the rotor is added to the ground velocity V and a retreating blade where the ground velocity V is subtracted from the rotational speed of the rotor are significantly different.

In particular, at a position of an azimuth angle ψ (angle measured counterclockwise from the rearward direction of the helicopter 1) of 90°, the airspeed of the advancing blade reaches a maximum and the airspeed of a tip of the advancing blade becomes Ω×R+V. At a position of ψ=270°, on the other hand, the airspeed of the retreating blade reaches a minimum and the airspeed of a tip of the retreating blade becomes Ω×R−V. The airspeed of an intermediate portion of the blade takes a value obtained by proportional distribution of Ω×R+V and Ω×R−V. For example, when Ω×R=795 km/h and V=278 km/h are assumed, the airspeed at a position of about 35% from the root end of the retreating blade becomes zero, as shown in FIG. 3A.

Since the airspeeds of the blades thus vary greatly while the blades make one revolution, various phenomena take place. On an advancing blade, drag coefficient Cd increases rapidly as the airspeeds approach the speed of sound. When the airspeeds are given in terms of Mach number M, drag divergence Mach number Mdd is defined as Mach number of a time when increment ΔCd of drag coefficient Cd divided by increment ΔM of Mach number (ΔCd/ΔM) becomes 0.1. Drag divergence Mach number Mdd depends on a blade aerofoil section, and it is said that the greater the value, the better the blade becomes because a higher airspeed of the blade can be achieved. It is common to set the airspeed of the tip of the advancing blade to around Mach 0.85.

On a retreating blade, on the other hand, since the airspeed thereof is significantly lowered, angle of attack α of the retreating blade must be greater in order to produce a lift similar to that of the advancing blade. For this purpose, it is common to carry out pitch control wherein a pitch angle of the blade is controlled in accordance to azimuth angle ψ. While the pitch angle of the blade is controlled as a sinewave function which has a minimum amplitude at ψ=90° and a maximum amplitude at ψ=270°, angle of attack α of the blade in this case varies in the direction of span as shown in FIG. 3B due to flapping of the blade itself. For example, when the blade is at the position of ψ=90°, the angle of attack α becomes about 0° at the root end and about 4° at the tip end. When ψ=270°, the angle of attack α of the blade becomes about 0° at the root end and about 16° to 18° at the tip end, thus exceeding the stall angle of attack.

Characteristics used for evaluating a retreating blade include maximum lift coefficient Clmax and stall angle of attack, the maximum lift coefficient Clmax is defined as the maximum value of lift coefficient when the angle of attack α of a blade having a particular aerofoil section is gradually increased and reached the stall angle of attack. The blade is said to be better when the values of maximum lift coefficient Clmax and stall angle of attack are greater.

FIG. 4 is a graph showing an operating environment of helicopter rotor blades. The advancing blade at ψ=90° has a Mach number near the drag divergence Mach number Mdd and a lift coefficient Cl of about zero. The blade at ψ=0° and 180° is in a hovering state which is independent of the ground velocity V, while Mach number M is about 0.6 and lift coefficient Cl is about 0.6. The retreating blade at ψ=270° has a Mach number of 0.3 to 0.5 and a lift coefficient Cl near the maximum lift coefficient Clmax. As the blade makes a full revolution, Mach number and lift coefficient vary greatly by going around these states described above.

Hence a helicopter blade aerofoil is required 1) to have a large value of drag divergence Mach number Mdd, and 2) to have a large value of maximum lift coefficient Clmax, while a better flight performance of a helicopter is achieved when these values are greater.

There are known as prior arts related to helicopter blade aerofoils, Japanese Unexamined Patent Publications JP-A 50-102099 (1975), JP-A 59-134096 (1984), JP-A 63-64894 (1988), JP-A 9-240593 (1997), and Japanese Examined Patent Publication JP-B2 62-34600 (1987), for example.

Recently such attempts have been proposed that helicopters take off and land regularly by using roof top heliport of buildings or operate public area heliports, and for which it is required to minimize the noise of helicopters in flight.

FIG. 5 is a graph showing frequency spectra of noises generated by a helicopter. The noises of the helicopter are classified into several categories on the basis of origins of the noises, while harmonic components of the main rotor rotation frequency are distributed in a range from 10 to 100 Hz, harmonic components of the tail rotor rotation frequency are distributed in a range from 60 to 300 Hz, and broadband noise of the main rotor is distributed from 100 to 10,000 Hz. When the helicopter is flying at high speed, HSI (High-Speed Impulsive noise) is generated in a range from 60 to 300 Hz.

SUMMARY OF THE INVENTION

An objective of the invention is to provide a helicopter blade aerofoil having large values of drag divergence Mach number Mdd and maximum lift coefficient Clmax and a reduced noise level.

The invention provides a helicopter blade aerofoil having coordinate values with ±3% errors of upper and lower surfaces on the basis of a reference aerofoil having a thickness to chord ratio of 8% (hereinafter referred to as AK080E), of which upper and lower surfaces are substantially defined by the following coordinates and of which leading edge profile is substantially defined by the following leading edge radius and center of a circle:

| X/C | Yup/C | Ylow/C |
| --- | --- | --- |
| 0.00000 | −0.00323 | −0.00323 |
| 0.00100 | 0.00155 | −0.00758 |
| 0.00250 | 0.00418 | −0.00925 |
| 0.00500 | 0.00782 | −0.01062 |
| 0.00750 | 0.01060 | −0.01155 |
| 0.01000 | 0.01312 | −0.01213 |
| 0.01750 | 0.01912 | −0.01316 |
| 0.02500 | 0.02381 | −0.01388 |
| 0.05000 | 0.03437 | −0.01561 |

-continued

| X/C | Yup/C | Ylow/C |
|---|---|---|
| 0.75000 | 0.04070 | −0.01707 |
| 0.10000 | 0.04466 | −0.01852 |
| 0.15000 | 0.04893 | −0.02100 |
| 0.20000 | 0.05083 | −0.02312 |
| 0.25000 | 0.05150 | −0.02506 |
| 0.30000 | 0.05149 | −0.02663 |
| 0.35000 | 0.05105 | −0.02775 |
| 0.40000 | 0.05016 | −0.02835 |
| 0.45000 | 0.04875 | −0.02839 |
| 0.50000 | 0.04663 | −0.02767 |
| 0.55000 | 0.04359 | −0.02618 |
| 0.60000 | 0.03974 | −0.02407 |
| 0.65000 | 0.03515 | −0.02146 |
| 0.70000 | 0.03000 | −0.01847 |
| 0.75000 | 0.02451 | −0.01523 |
| 0.80000 | 0.01892 | −0.01187 |
| 0.85000 | 0.01347 | −0.00851 |
| 0.90000 | 0.00836 | −0.00529 |
| 0.95000 | 0.00381 | −0.00233 |
| 1.00000 | 0.00207 | −0.00079 |

Leading edge radius r/C=0.01073,

Center of circle X/C=0.01072, Y/C=−0.00373, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

According to the invention, since the leading edge radius and the camber line are optimized in comparison with a conventional symmetric blade having a thickness to chord ratio of 8% (for example, NACA008), and as compared with AK080A and AK080B of JP-A 9-240593 applied by the present applicant, an optimum leading edge droop is added and the trailing edge profile is optimized, thereby pressure distribution over the upper surface of the airfoil is flattened while controlling a moment coefficient small and the noise level of the main rotor rotation can be reduced by several dB points from that of the prior art. Moreover, the maximum lift coefficient Clmax is greatly improved. Furthermore, since the aerofoil of the invention also give a greater drag divergence Mach number Mdd, generation of shock wave causing HSI noise can be also suppressed.

The invention also provides a helicopter blade aerofoil having coordinate values with ±3% errors of upper and lower surfaces on the basis of an aerofoil having a thickness to chord ratio of 5% to 11% defined on the basis of the aforementiond reference aerofoil having a thickness to chord ratio of 8% (AK080E).

According to the invention, an aerofoil having a thickness to chord ratio of 5% (AK050E) is obtained by multiplying the values of Yup/C and Ylow/C by 5/8 for all chord lines X/C on the basis of the aerofoil having a thickness to chord ratio of 8% (AK080E), and on the other hand, an aerofoil having a thickness to chord ratio of 11% (AK110E) is obtained by multiplying the values by 11/8. Therefore, similar effect can be achieved with any aerofoil having a thickness ratio within a range from 5% to 11%, obtained by multiplying a constant factor for the reference aerofoil (AK080E).

Also the invention provides a helicopter blade aerofoil having coordinate values with ±3% errors of upper and lower surfaces on the basis of a reference aerofoil having a thickness to chord ratio of 8% (hereinafter referred to as AK080F), of which upper and lower surfaces are substantially defined by the following coordinates and of which leading edge profile is substantially defined by the following leading edge radius and center of a circle:

| X/C | Yup/C | Ylow/C |
|---|---|---|
| 0.00000 | −0.00611 | −0.00611 |
| 0.00100 | 0.00114 | −0.00953 |
| 0.00250 | 0.00268 | −0.01084 |
| 0.00500 | 0.00588 | −0.01231 |
| 0.00750 | 0.00908 | −0.01294 |
| 0.01000 | 0.01163 | −0.01340 |
| 0.01750 | 0.01794 | −0.01438 |
| 0.02500 | 0.02285 | −0.01504 |
| 0.05000 | 0.03394 | −0.01658 |
| 0.75000 | 0.04051 | −0.01765 |
| 0.10000 | 0.04455 | −0.01842 |
| 0.15000 | 0.04883 | −0.01979 |
| 0.20000 | 0.05068 | −0.02164 |
| 0.25000 | 0.05129 | −0.02365 |
| 0.30000 | 0.05113 | −0.02547 |
| 0.35000 | 0.05045 | −0.02671 |
| 0.40000 | 0.04919 | −0.02720 |
| 0.45000 | 0.04720 | −0.02692 |
| 0.50000 | 0.04451 | −0.02596 |
| 0.55000 | 0.04112 | −0.02440 |
| 0.60000 | 0.03714 | −0.02236 |
| 0.65000 | 0.03266 | −0.01992 |
| 0.70000 | 0.02786 | −0.01718 |
| 0.75000 | 0.02288 | −0.01423 |
| 0.80000 | 0.01785 | −0.01118 |
| 0.85000 | 0.01291 | −0.00810 |
| 0.90000 | 0.00819 | −0.00510 |
| 0.95000 | 0.00382 | −0.00228 |
| 1.00000 | 0.00207 | −0.00079 |

Leading edge radius r/C=0.00904

Center of circle X/C=0.00902, Y/C=−0.00553, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

According to the invention, similarly to the aforementiond case, since the leading edge radius and the camber line are optimized in comparison with a conventional symmetric blade (for example, NACA0008), and as compared with AK080A and AK080B of JP-A 9-240593 applied by the present applicant, an optimum leading edge droop is added and the trailing edge profile is optimized, thereby pressure distribution over the upper surface of the airfoil is flattened while controlling a moment coefficient small and the noise level of the main rotor rotation can be reduced by several dB points from that of the prior art. Moreover, the maximum lift coefficient Clmax is greatly improved. Furthermore, since the aerofoil of the invention also give a greater drag divergence Mach number Mdd, generation of shock wave causing HSI noise can be also suppressed.

The invention also provides a helicopter blade aerofoil having coordinate values with ±3% errors of upper and lower surfaces on the basis of an aerofoil having a thickness to chord ratio of 5% to 11% defined on the basis of the aforementiond reference aerofoil having a thickness to chord ratio of 8% (AK080F).

According to the invention, an aerofoil having a thickness to chord ratio of 5% (AK050F) is obtained by multiplying the values of Yup/C and Ylow/C by 5/8 for all chord lines X/C on the basis of the aerofoil having a thickness to chord ratio of 8% (AK080F), and on the other hand, an aerofoil having a thickness to chord ratio of 11% (AK110F) is obtained by multiplying the values by 11/8. Therefore, similar effect can be achieved with any aerofoil having a thickness ratio within a range from 5% to 11%, obtained by multiplying a constant factor for the reference aerofoil (AK080F).

BRIEF DESCRIPTION OF THE DRAWINGS

Other and further objects, features, and advantages of the invention will be more explicit from the following detailed description taken with reference to the drawings wherein:

FIG. 5 is a graph showing frequency spectrums of noise generated by a helicopter.

DETAILED DESCRIPTION OF THE PREFERRED EMBODIMENTS

Figure 1A:
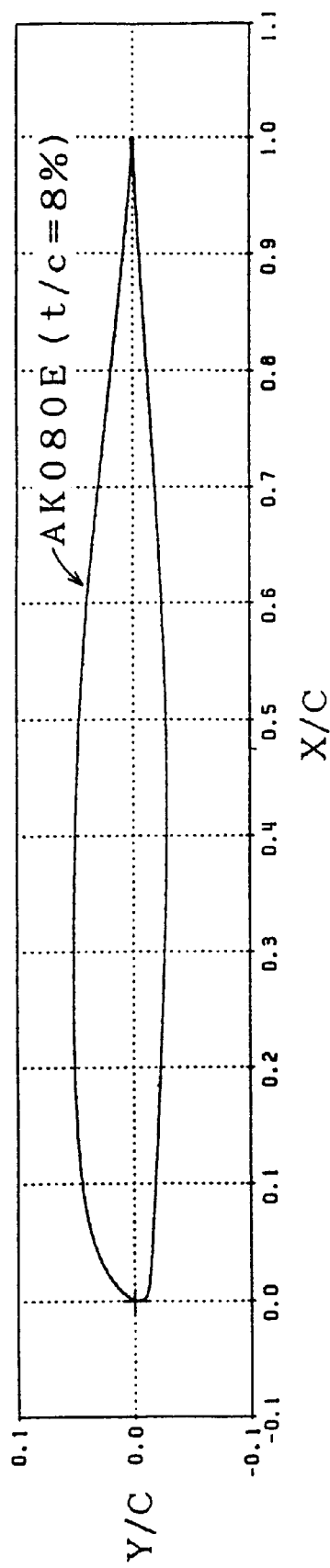
FIG. 1A is a graph showing an aerofoil configuration of AK080E according to a first embodiment of the invention.

Now referring to the drawings, preferred embodiments of the invention are described below.

Figure 1B:
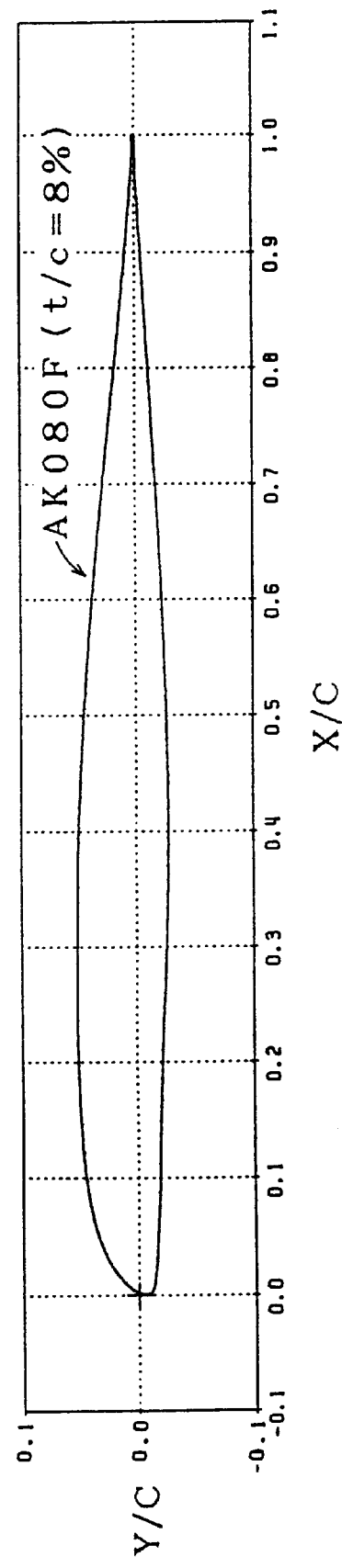
FIG. 1B is a graph showing an aerofoil configuration of AK080F according to a second embodiment of the invention.

FIG. 1A is a graph showing the aerofoil configuration of AK080E of a first embodiment of the invention, having a thickness to chord ratio of t/c=8%. FIG. 1B is a graph showing the aerofoil configuration of AK080F of a second embodiment of the invention, having a thickness to chord ratio of t/c=8%.

In the aerofoils AK080E and AK080F of the invention, the leading edge radius, camber line, and as well leading edge droop are optimized so that pressure distribution over the upper surface of the aerofoil is flattened, in particular, the peak pressure around the leading edge is suppressed, compared with a conventional symmetric aerofoil(NACA0008). Therefore the noise level of main rotor rotation can be reduced by several dB points over the prior art.

Moreover, since the aerofoils of the invention have the profile characteristics described previously (the leading edge radius, camber line, and leading edge droop are optimized), lift is increased, resulting in a great improvement in the maximum lift coefficient Clmax.

Furthermore, since each aerofoil of the invention also gives a greater drag divergence Mach number Mdd, the intensity of shock wave causing HSI noise can be also reduced.

Figure 2:
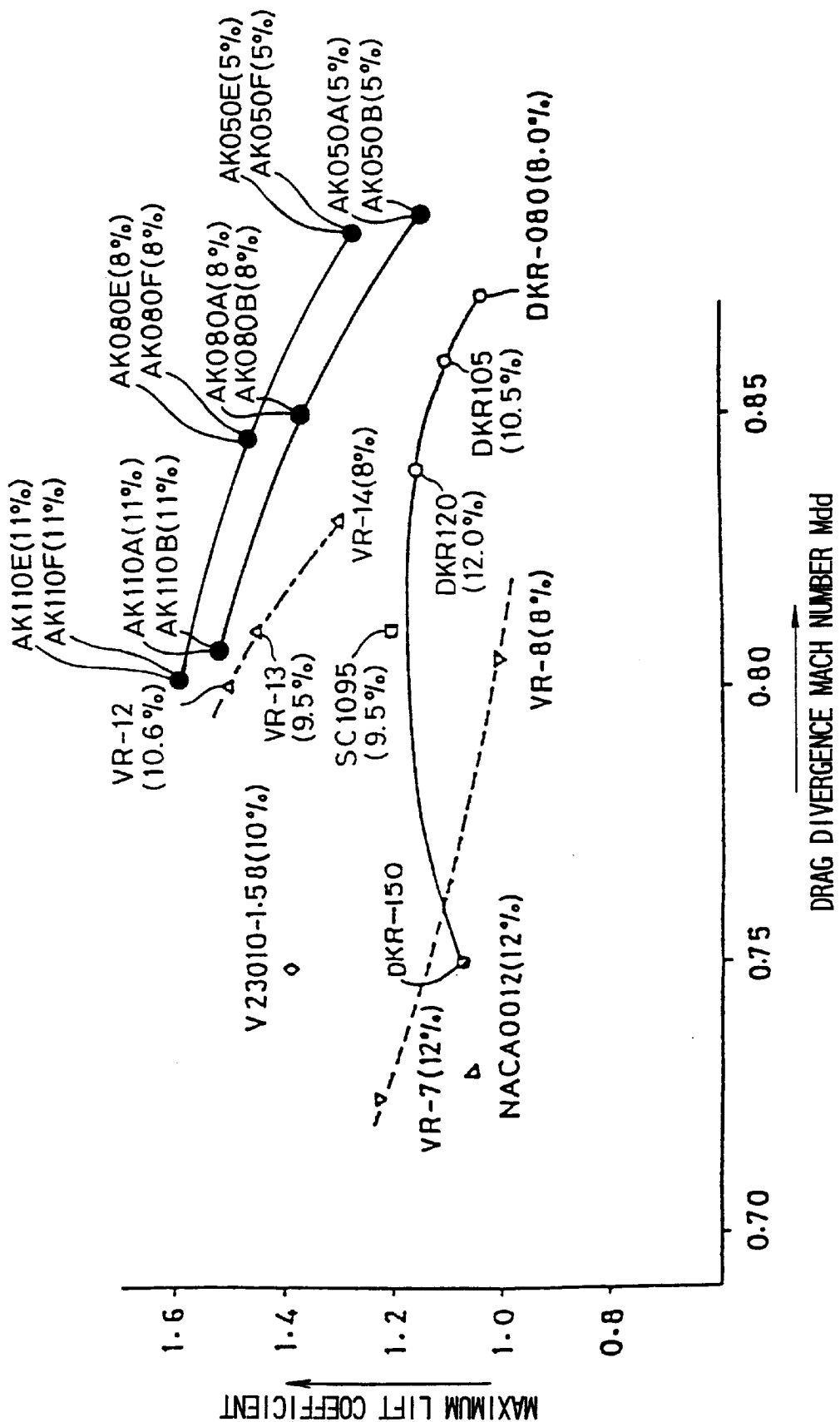
FIG. 2 is a graph showing results of comparing aerofoils of the invention and the prior art.
Figure 3A:
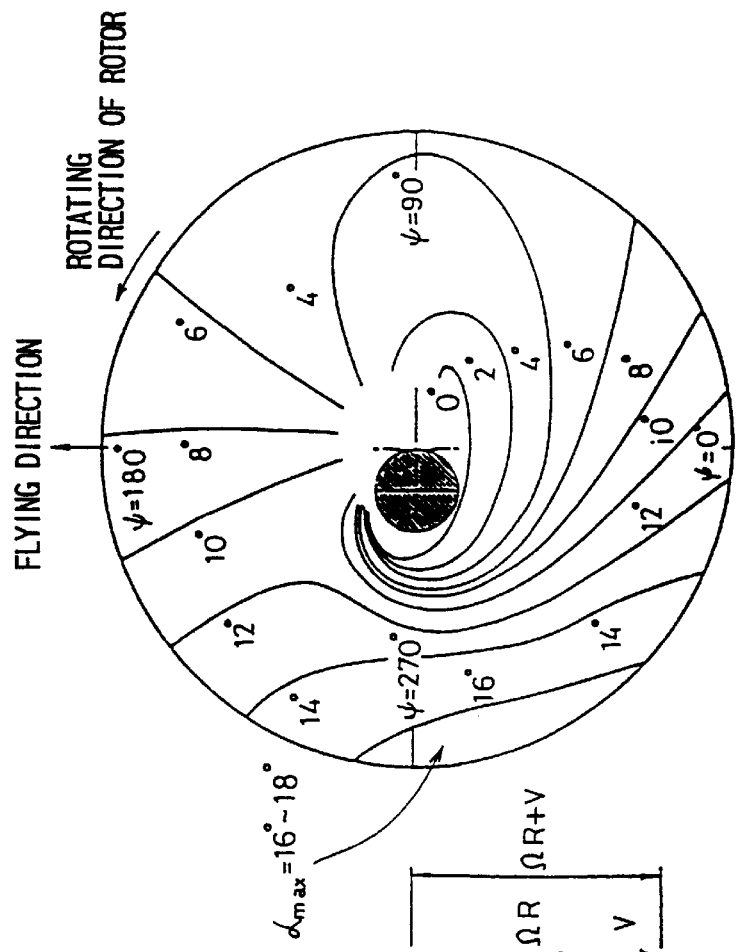
FIGS. 3A and 3B show aerodynamic characteristics of a rotor of a helicopter in forward flight.
Figure 3B:
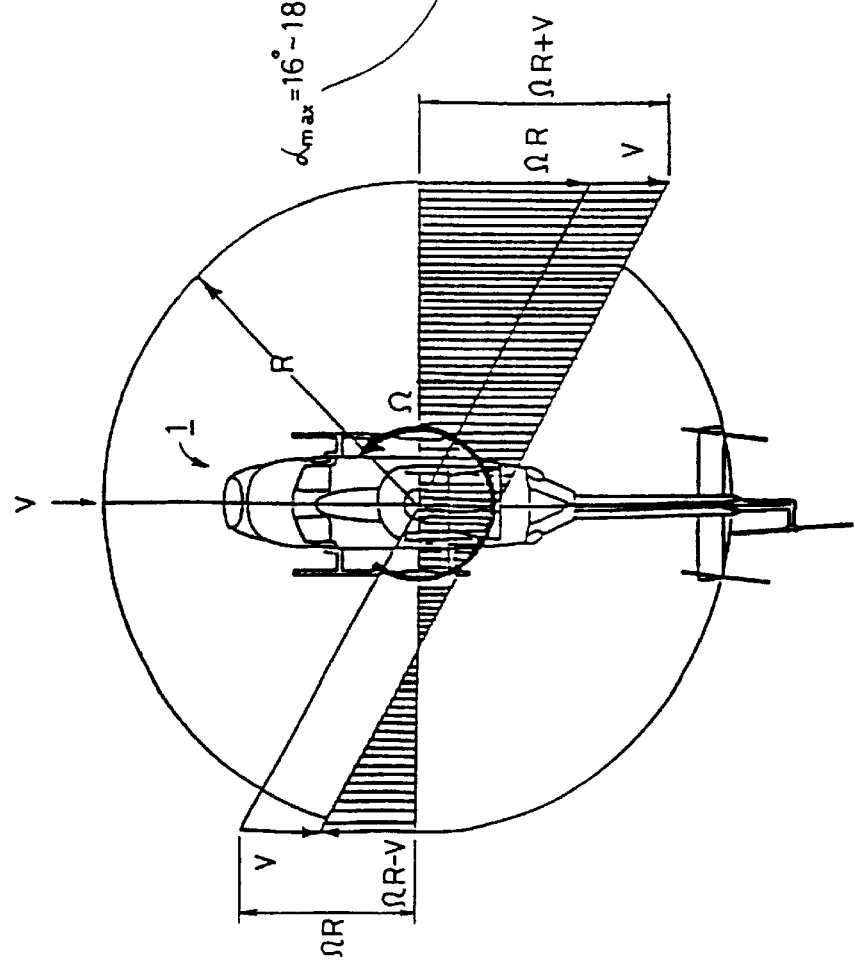

FIG. 2 is a graph showing results of comparing aerofoils of the invention and the prior art. This graph is drawn by using FIG. 3 of Japanese Unexamined Patent Publication JP-A 59-134096 (1984). Reference characters identifying different points in the graph are abbreviations of the names of the aerofoils, with numbers in parentheses showing the thickness to chord ratio (t/c).

Figure 4:
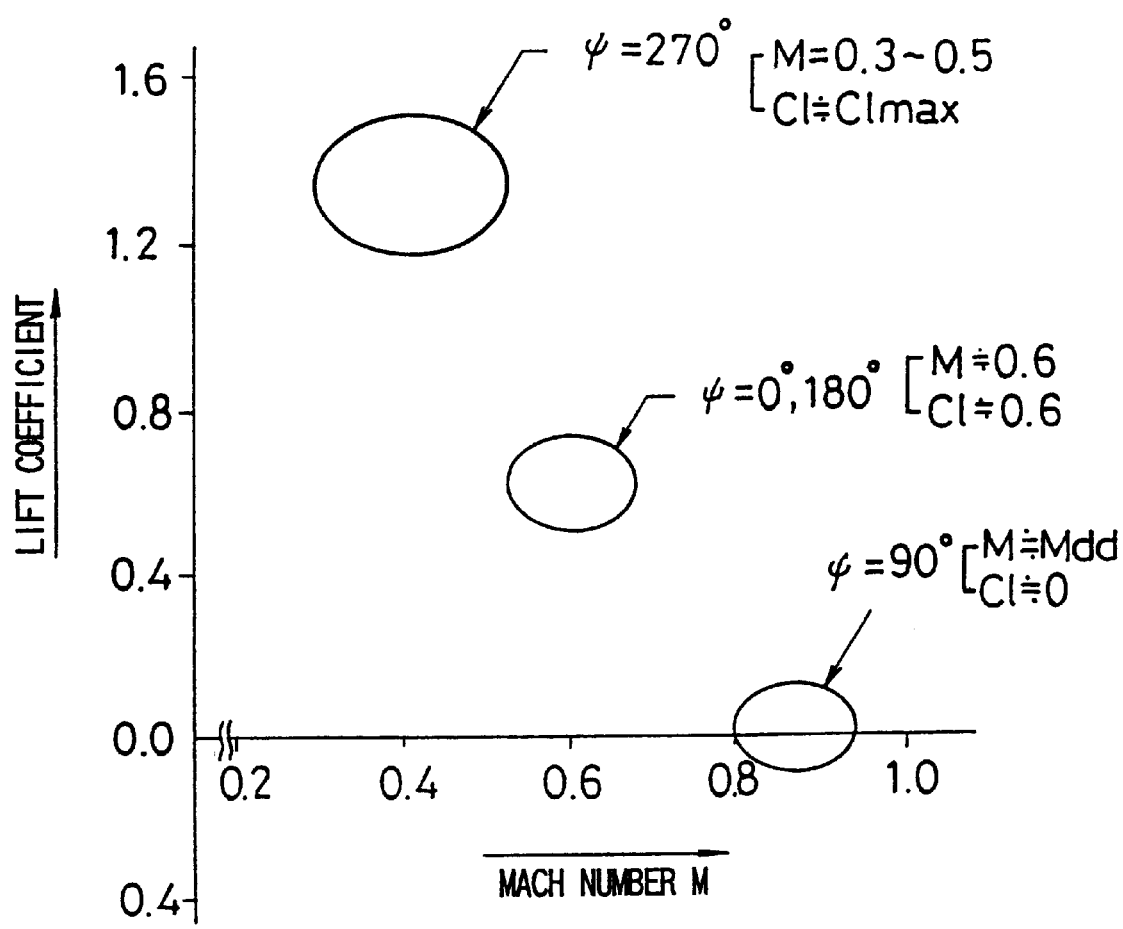
FIG. 4 is a graph showing an operating environment of a helicopter blade.

The aerofoils AK080E and AK080F of the invention having thickness to chord ratio of 8% give a drag divergence Mach number Mdd of approximately 0.84 and a maximum lift coefficient Clmax of approximately 1.42, showing great improvement in both of these values. Consequently, as shown in FIG. 4, it is made possible to shift the loci of coordinates of the Mach number and lift coefficient in a direction toward right upward of FIG. 4 as a whole, while the rotor makes a full revolution, indicating a superior performance of the aerofoils of the invention as a helicopter blade aerofoil.

In the aerofoil AK050E and AK050F, which are obtained by changing the thickness to chord ratio to 5% on the basis of the aerofoils AK080E and AK080F, on the other hand, drag divergence Mach number Mdd is greatly improved, while the aerofoils AK110E and AK110F of which thickness to chord ratios are changed to 11% have a greatly improved maximum lift coefficient Clmax, indicating that the aerofoils having a thickness to chord ratio within a range from 5% to 11% have far better performance than the prior arts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A helicopter blade aerofoil having coordinate values with ±3% errors of upper and lower surfaces on the basis of a reference aerofoil having a thickness to chord ratio of 5% to 11%, of which upper and lower surfaces are substantially defined by the following coordinates and of which a leading edge profile is substantially defined by the following leading edge radius and center of a circle:

| X/C | Yup/C | Ylow/C |
| --- | --- | --- |
| 0.00000 | −0.00323 | −0.00323 |
| 0.00100 | 0.00155 | −0.00758 |
| 0.00250 | 0.00418 | −0.00925 |
| 0.00500 | 0.00782 | −0.01062 |
| 0.00750 | 0.01060 | −0.01155 |
| 0.01000 | 0.01312 | −0.01213 |
| 0.01750 | 0.01912 | −0.01316 |
| 0.02500 | 0.02381 | −0.01388 |
| 0.05000 | 0.03437 | −0.01561 |
| 0.75000 | 0.04070 | −0.01707 |
| 0.10000 | 0.04466 | −0.01852 |
| 0.15000 | 0.04893 | −0.02100 |
| 0.20000 | 0.05083 | −0.02312 |
| 0.25000 | 0.05150 | −0.02506 |
| 0.30000 | 0.05149 | −0.02663 |
| 0.35000 | 0.05105 | −0.02775 |
| 0.40000 | 0.05016 | −0.02835 |
| 0.45000 | 0.04875 | −0.02839 |
| 0.50000 | 0.04663 | −0.02767 |
| 0.55000 | 0.04359 | −0.02618 |
| 0.60000 | 0.03974 | −0.02407 |
| 0.65000 | 0.03515 | −0.02146 |
| 0.70000 | 0.03000 | −0.01847 |
| 0.75000 | 0.02451 | −0.01523 |
| 0.80000 | 0.01892 | −0.01187 |
| 0.85000 | 0.01347 | −0.00851 |
| 0.90000 | 0.00836 | −0.00529 |
| 0.95000 | 0.00381 | −0.00233 |
| 1.00000 | 0.00207 | −0.00079 |

Leading edge radius r/C=0.01073,

Center of circle X/C=0.01072, Y/C=−0.00373, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

2. A helicopter blade aerofoil having coordinate values with ±3% errors of upper and lower surfaces on the basis of an aerofoil having a thickness to chord ratio of 8% defined on the basis of the reference aerofoil of claim 1 having the thickness to chord ratio of 8%.

3. A helicopter blade aerofoil having coordinate values with ±3% errors of upper and lower surfaces on the basis of a reference aerofoil having a thickness to chord ratio of 5% to 11%, of which upper and lower surfaces are substantially defined by the following coordinates and of which a leading edge profile is substantially defined by the following leading edge radius and center of a circle:

| X/C | Yup/C | Ylow/C |
| --- | --- | --- |
| 0.00000 | −0.00611 | −0.00611 |
| 0.00100 | 0.00114 | −0.00953 |
| 0.00250 | 0.00268 | −0.01084 |
| 0.00500 | 0.00588 | −0.01231 |
| 0.00750 | 0.00908 | −0.01294 |
| 0.01000 | 0.01163 | −0.01340 |
| 0.01750 | 0.01794 | −0.01438 |
| 0.02500 | 0.02285 | −0.01504 |
| 0.05000 | 0.03394 | −0.01658 |
| 0.75000 | 0.04051 | −0.01765 |
| 0.10000 | 0.04455 | −0.01842 |
| 0.15000 | 0.04883 | −0.01979 |
| 0.20000 | 0.05068 | −0.02164 |
| 0.25000 | 0.05129 | −0.02365 |
| 0.30000 | 0.05113 | −0.02547 |
| 0.35000 | 0.05045 | −0.02671 |
| 0.40000 | 0.04919 | −0.02720 |
| 0.45000 | 0.04720 | −0.02692 |
| 0.50000 | 0.04451 | −0.02596 |
| 0.55000 | 0.04112 | −0.02440 |
| 0.60000 | 0.03714 | −0.02236 |
| 0.65000 | 0.03266 | −0.01992 |
| 0.70000 | 0.02786 | −0.01718 |
| 0.75000 | 0.02288 | −0.01423 |
| 0.80000 | 0.01785 | −0.01118 |
| 0.85000 | 0.01291 | −0.00810 |
| 0.90000 | 0.00819 | −0.00510 |
| 0.95000 | 0.00382 | −0.00228 |
| 1.00000 | 0.00207 | −0.00079 |

Leading edge radius r/C=0.00904

Center of circle X/C=0.00902, Y/C=−0.00553, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

4. A helicopter blade aerofoil having coordinate values with ±3% errors of upper and lower surfaces on the basis of an aerofoil having a thickness to chord ratio of 8% defined on the basis of the reference aerofoil of claim 3 having the thickness to chord ratio of 8%.

* * * * *